United States Patent
Anma

(10) Patent No.: US 9,623,943 B2
(45) Date of Patent: Apr. 18, 2017

(54) JET PROPULSION BOAT

(71) Applicant: YAMAHA HATSUDOKI KABUSHIKI KAISHA, Iwata-shi, Shizuoka (JP)

(72) Inventor: Hirofumi Anma, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 128 days.

(21) Appl. No.: 14/626,940

(22) Filed: Feb. 20, 2015

(65) Prior Publication Data

US 2015/0239541 A1 Aug. 27, 2015

(30) Foreign Application Priority Data

Feb. 21, 2014 (JP) .................................. 2014-032176

(51) Int. Cl.
*B63H 11/04* (2006.01)
*B63B 35/73* (2006.01)
*B63J 99/00* (2009.01)

(52) U.S. Cl.
CPC ............ *B63H 11/04* (2013.01); *B63B 35/731* (2013.01); *B63J 2099/008* (2013.01); *Y02T 70/742* (2013.01)

(58) Field of Classification Search
CPC .............................. B63H 11/04; B63B 35/731
USPC ........................................................... 440/1
See application file for complete search history.

(56) References Cited

U.S. PATENT DOCUMENTS

| 6,733,350 | B2 * | 5/2004 | Iida ........................ | B63H 21/22 440/84 |
| 7,315,779 | B1 * | 1/2008 | Rioux ...................... | B62J 27/00 123/352 |
| 7,530,345 | B1 * | 5/2009 | Plante .................... | B60K 31/00 123/361 |
| 8,075,356 | B2 * | 12/2011 | Ito ........................ | B63H 21/265 440/86 |
| 8,753,154 | B2 * | 6/2014 | Fujino .................... | B63H 25/04 440/1 |
| 9,403,586 | B2 * | 8/2016 | Okamoto ................ | B63H 11/11 |
| 2002/0155766 | A1 * | 10/2002 | Hattori .................. | F02B 61/045 440/88 A |
| 2003/0013354 | A1 * | 1/2003 | Yanagihara ............ | B63H 21/21 440/1 |
| 2006/0208169 | A1 * | 9/2006 | Breed .................... | B60N 2/002 250/221 |

(Continued)

FOREIGN PATENT DOCUMENTS

JP 2008-094256 A 4/2008
JP 2008-291774 A 12/2008

*Primary Examiner* — Lars A Olson
*Assistant Examiner* — Jovon Hayes
(74) *Attorney, Agent, or Firm* — Keating and Bennett, LLP

(57) ABSTRACT

A jet propulsion boat includes a boat body, a jet propelling apparatus configured to propel the boat body, an engine configured to drive the jet propelling apparatus, and an ECU. The ECU is configured or programmed to determine that a deceleration operation is performed when an amount of operation of a first accelerator operation section is greater than an amount of operation of a second accelerator operation section. The ECU sets an upper limit value for the number of revolutions of the engine to a first predetermined value if the boat body is in a first speed traveling state and the boat body is in a turning state.

10 Claims, 4 Drawing Sheets

(56) References Cited

U.S. PATENT DOCUMENTS

| | | | |
|---|---|---|---|
| 2008/0096445 A1* | 4/2008 | Nanami | B63B 35/731 440/1 |
| 2008/0293311 A1* | 11/2008 | Miguchi | B63B 35/731 440/1 |
| 2010/0068953 A1* | 3/2010 | Ito | B63H 21/265 440/86 |
| 2010/0210155 A1* | 8/2010 | Kinoshita | G01F 23/74 440/1 |
| 2013/0102206 A1* | 4/2013 | Fujino | B63H 25/04 440/1 |
| 2013/0344754 A1* | 12/2013 | Kinoshita | B63H 21/21 440/1 |
| 2015/0239541 A1* | 8/2015 | Anma | B63B 35/731 440/1 |

* cited by examiner

JET PROPULSION BOAT

BACKGROUND OF THE INVENTION

1. Field of the Invention

The present invention relates to jet propulsion boats, and more specifically to a jet propulsion boat which generates a propulsion force by jetting water with power from an engine.

2. Description of the Related Art

JP-A 2008-291774 discloses a conventional example for this type of technique. JP-A 2008-291774 discloses a technique (a so called OTS system; Off Throttle Steering system) of differentiating two cases of turning and straight traveling from each other in a decelerated state and controls the engine output so as to keep thrust at a level such the boat can make a turn if it is determined that the boat is in a turning state. In particular, JP-A 2008-291774 discloses that the turning operation is assisted with a sustained engine output when the jet propulsion boat makes a turn while traveling at a slow speed.

Generally, in so called personal water crafts (PWCs), an upper limit value for the number of engine revolutions is set for a straight traveling pattern regardless of whether the craft is moving straight or turning. As a result, a PWC has a characteristic tendency that it has a large sideway thrust at the time of turning with a strong centrifugal force acting on the side of the PWC.

JP-A 2008-291774 discloses nothing about control techniques for making a turn while traveling at a high speed.

SUMMARY OF THE INVENTION

Preferred Embodiments of the Present Invention significantly reduce centrifugal forces acting on a side of a boat body when turning the boat body while traveling at a high speed, thus reducing a load exerted on a rider, and provide a jet propulsion boat which allows the boat body to be turned with a lower level of skill than that conventionally required.

According to a preferred embodiment of the present invention, a jet propulsion boat includes a boat body; a jet propelling apparatus configured to propel the boat body; an engine configured to drive the jet propelling apparatus; a speed determination section configured or programmed to determine whether or not the boat body is in a high speed traveling state; a turning state determination section configured or programmed to determine whether or not the boat body is in a turning state; and a controller configured or programmed to control the engine based on results of the determinations made by the speed determination section and the turning state determination section. With the above arrangement, the controller configured or programmed to decrease the number of revolutions of the engine if the speed determination section determines that the boat body is in a high speed traveling state and the turning state determination section determines that the boat body is in the turning state.

According to a preferred embodiment of the present invention, the number of revolutions of the engine is decreased when the boat body makes a turn while traveling at a high speed. Therefore, the centrifugal force acting on the side of the boat body (lateral G force) is significantly reduced, and a load exerted on the rider is decreased even when traveling at a high speed. Accordingly, the above arrangement makes it possible to turn the boat body with a lower level of skill than that conventionally required.

According to a preferred embodiment of the present invention, the controller is configured or programmed to set an upper limit value for the number of revolutions of the engine if the speed determination section determines that the boat body is in a high speed traveling state and the turning state determination section determines that the boat body is in the turning state. By setting an upper limit value for the number of revolutions of the engine as described above, and thus reducing a load exerted on the rider when travelling at a high speed, it becomes possible to reliably turn the boat body with a lower level of skill than that conventionally required.

According to a preferred embodiment of the present invention, the controller is configured or programmed to set the upper limit value for the number of revolutions of the engine to a first predetermined value if the speed determination section determines that the boat body is in a high speed traveling state and the turning state determination section determines that the boat body is in the turning state, whereas the controller is configured or programmed to set the upper limit value for the number of revolutions of the engine to a second predetermined value, which is greater than the first predetermined value, if the speed determination section determines that the boat body is in a high speed traveling state but the turning state determination section determines that the boat body is not in the turning state. If an upper limit value for the number of engine revolutions is set for a straight traveling pattern regardless of whether the jet propulsion boat is moving straight or turning, without differentiating the upper limit value for the number of engine revolutions for the straight traveling state and that for a turning state of the boat, the boat has a large sideway thrust at the time of turning with a strong centrifugal force acting on the side of the boat body. To solve this problem, when the boat body is moving at a high speed, an upper limit value for the number of revolutions of the engine is set to the first predetermined value if the boat body is turning, while on the other hand, the upper limit value for the number of revolutions of the engine is set to the second predetermined value, which is greater than the first predetermined value, if the boat body is not turning. This makes it possible to reduce the lateral thrust when making a turn, i.e., to reduce the centrifugal force acting on the side of the boat body, while ensuring the braking capability to decelerate the boat body when not making a turn (when traveling straight).

According to a preferred embodiment of the present invention, the controller is configured or programmed to control the engine based on results of the determinations made by the speed determination section and the turning state determination section when a deceleration operation is determined. In this case, a load exerted on the rider is significantly reduced even when traveling at a high speed if deceleration is the intention of the operator. This makes it possible to turn the boat body with a lower level of skill than that conventionally required.

According to a preferred embodiment of the present invention, the jet propelling apparatus includes a reverse bucket configured to move to a first position to move the boat body forward, and to a second position to decrease a forward propulsion force of the boat body. In this case, the reverse bucket changes the direction of the jetted water from the jet propelling apparatus, thus making it possible to easily and reliably decelerate the boat body.

According to a preferred embodiment of the present invention, the jet propulsion boat further includes a first accelerator operation section configured to control operations of the boat body. With this arrangement, the controller is configured or programmed to determine the reverse bucket position at least based on an operation of the first accelerator operation section. In this case, the deceleration operation is performed easily by operating the first accelerator operation section.

According to a preferred embodiment of the present invention, the jet propulsion boat further includes a second accelerator operation section configured to control operations of the boat body. With this arrangement, the controller is configured or programmed to determine the reverse bucket position based on an amount of the operation of the first accelerator operation section and an amount of operation of the second accelerator operation section. In this case, for example, if the amount of operation of the first accelerator operation section is not greater than the amount of operation of the second accelerator operation section, then the reverse bucket is disposed at the first position. On the other hand, if the amount of operation of the first accelerator operation section is greater than the amount of operation of the second accelerator operation section, then this represents a deceleration operation, and the reverse bucket is disposed at the second position. This changes the direction of the jetted water from the jet propelling apparatus, thus making it possible to easily decelerate the boat body.

According to a preferred embodiment of the present invention, the jet propulsion boat further includes a first accelerator operation section and a second accelerator operation section configured to control operations of the boat body. With this arrangement, the controller is configured or programmed to determine that the deceleration operation is made when the amount of operation of the first accelerator operation section is greater than the amount of operation of the second accelerator operation section. In this case, deceleration operation is performed easily by simply operating the first accelerator operation section and the second accelerator operation section.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
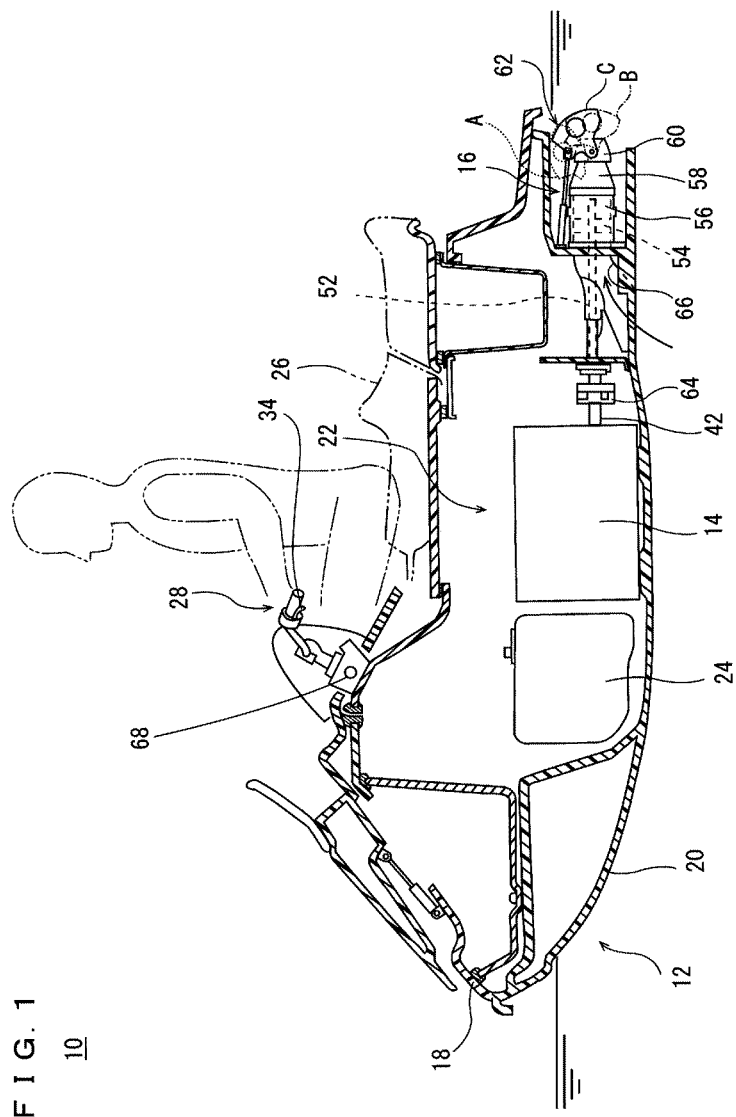
FIG. 1 is an illustrative sectional drawing which shows a general configuration of a jet propulsion boat according to a preferred embodiment of the present invention.

Referring to FIG. 1, a jet propulsion boat 10 according to a preferred embodiment of the present invention is preferably a so called personal water craft, for example. As shown in FIG. 1, the jet propulsion boat 10 includes a boat body 12, an engine 14, and a jet propelling apparatus 16. The boat body 12 includes a deck 18 and a hull 20. The boat body 12 includes an engine room 22 inside thereof. The engine 14, a fuel tank 24, etc. are housed inside the engine room 22. A seat 26 is installed on the deck 18. The seat 26 is above the engine 14. In front of the seat 26, there is disposed a steering handle 28 to steer the boat body 12.

Figure 2:
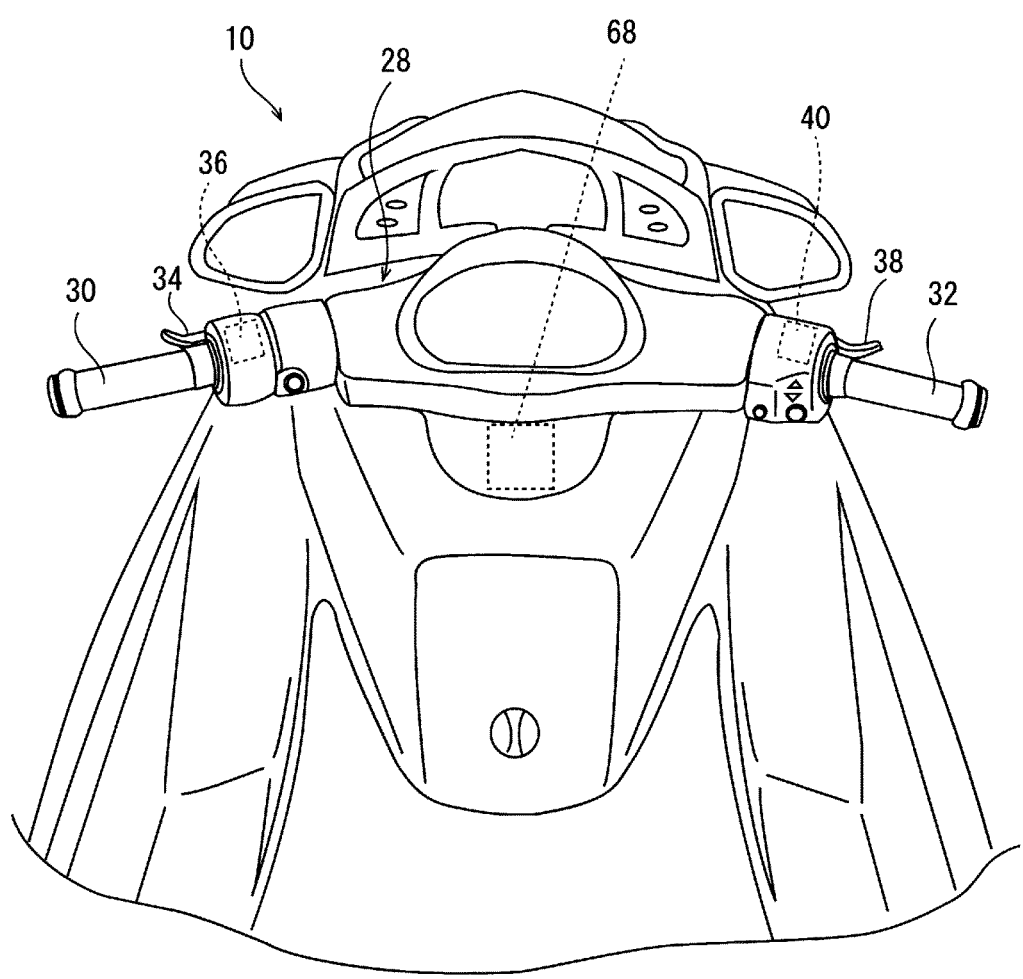
FIG. 2 is an illustrative drawing which shows an arrangement around a steering handle of the jet propulsion boat.

As shown in FIG. 2, the steering handle 28 includes a left grip 30 and a right grip 32 to be gripped by the operator to perform steering. The left grip 30 is provided with a first accelerator operation section 34 to control operations of the boat body 12. The first accelerator operation section 34 is used primarily to reverse the jet propulsion boat 10 or to decrease a forward traveling speed of the jet propulsion boat 10. In the present preferred embodiment, the first accelerator operation section 34 includes a lever, and an output increases as the lever is squeezed. The first accelerator operation section 34 is connected to a position sensor 36. The position sensor 36 outputs a signal which indicates an amount of operation of the first accelerator operation section 34 to an ECU 72 shown in FIG. 3.

The right grip 32 is provided with a second accelerator operation section 38 to control operations of the boat body 12. The second accelerator operation section 38 is used primarily to make the jet propulsion boat 10 travel forward. In the present preferred embodiment, the second accelerator operation section 38 includes a lever, and an output increases as the lever is squeezed. The second accelerator operation section 38 is connected to a position sensor 40. The position sensor 40 outputs a signal which indicates an amount of operation of the second accelerator operation section 38 to the ECU 72.

Figure 3:
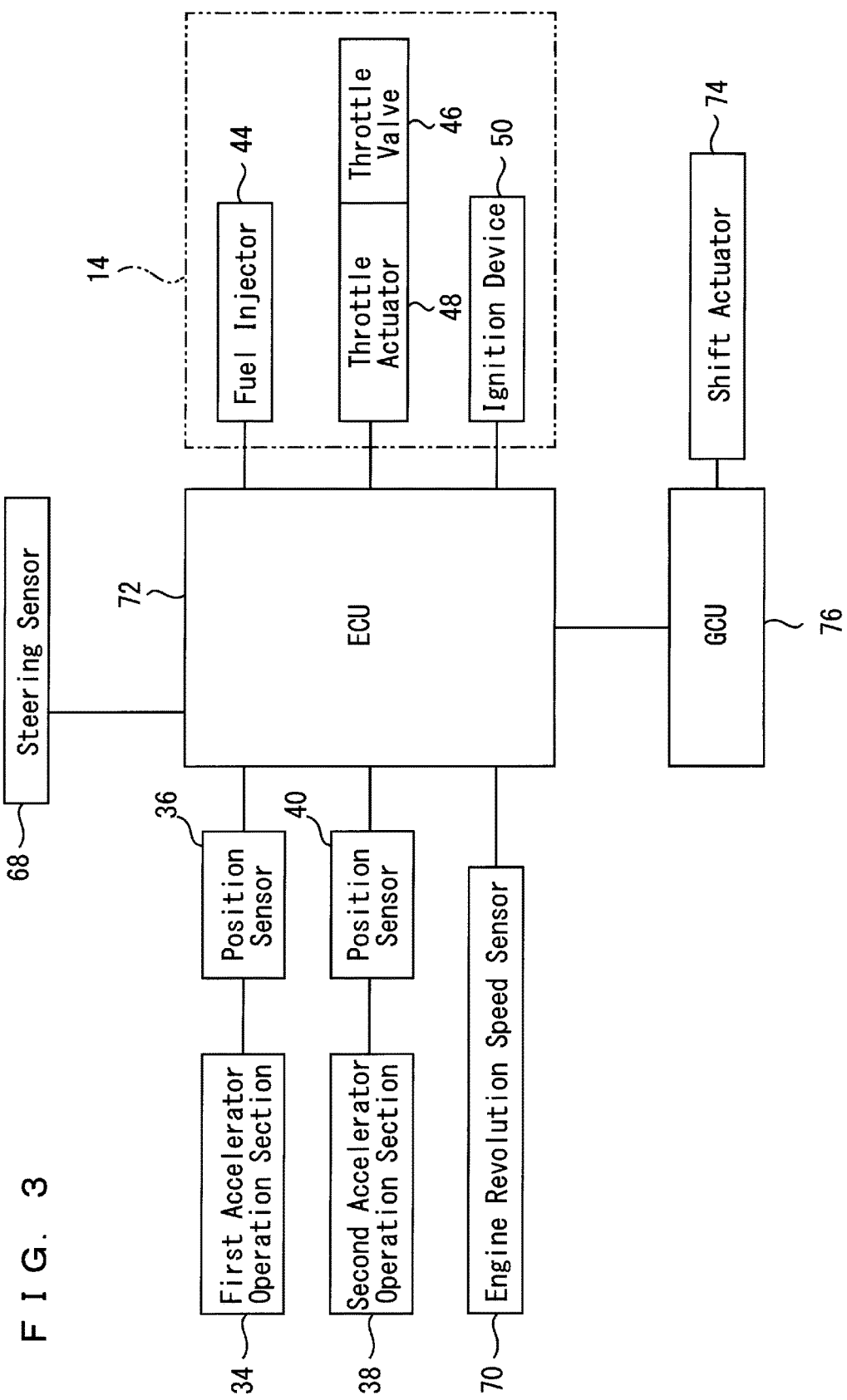
FIG. 3 is a block diagram which shows a control system of the jet propulsion boat.

Referring to FIG. 1 and FIG. 3, the engine 14 includes a crank shaft 42, a fuel injector 44, a throttle valve 46, a throttle actuator 48, and an ignition device 50. The crank shaft 42 extends in a fore-aft direction. The fuel injector 44 injects fuel which is supplied to combustion chambers of the engine 14. As the throttle valve 46 changes its aperture size, adjustment is made to an amount of air-fuel mix sent to the combustion chambers. The throttle valve 46 preferably is provided commonly to a plurality of cylinders of the engine 14. However, the throttle valve 46 may be provided for each cylinder of the engine 14. The throttle actuator 48 changes the aperture size of the throttle valve 46. The ignition device 50 ignites the fuel inside the combustion chambers. Although not shown in FIG. 3, the fuel injector 44 and the ignition device 50 is preferably provided for each cylinder of the engine 14.

The jet propelling apparatus 16 uses a driving force from the engine 14 and generates a propulsion force to propel the boat body 12. The jet propelling apparatus 16 sucks in and jets out water from around the boat body 12. As shown in FIG. 1, the jet propelling apparatus 16 includes an impeller shaft 52, an impeller 54, an impeller housing 56, a nozzle 58, a deflector 60, and a reverse bucket 62. The impeller shaft 52 extends rearward from the engine room 22. The impeller shaft 52 has its forward portion connected to the crank shaft 42 via a coupling section 64. The impeller shaft 52 has its rear portion extending through a water suction section 66 of the boat body 12 into the impeller housing 56. The impeller 54 jets the sucked in water out of the nozzle 58 in a rearward direction. The deflector 60 is behind the nozzle 58. The deflector 60 changes the direction of the jetted water from the nozzle 58 in a left or right direction.

The reverse bucket 62 is disposed behind the deflector 60. The reverse bucket 62 is configured to change the water jetted from the nozzle 58 and the deflector 60 to a forward direction. Specifically, the reverse bucket 62 is configured to move to a forward traveling position A, a rearward traveling position B, and a neutral position C (see FIG. 1). FIG. 1 shows the forward traveling position A in broken lines, the rearward traveling position B in alternate long and short dash lines, and the neutral position C in solid lines, respectively. The reverse bucket 62 does not change the direction of water jetted from the jet propelling apparatus 16 at the forward traveling position A. Therefore, the reverse bucket 62 allows the boat body 12 to move forward at the forward traveling position A. At the rearward traveling position B, the reverse bucket 62 changes the direction of water jetted from the jet propelling apparatus 16 in the left/right directions of the boat body 12. Therefore, at the rearward traveling position B, the reverse bucket 62 decreases the forward propulsion force that moves the boat body 12 forward. This decelerates the boat body 12. The neutral position C is between the forward traveling position A and the rearward traveling position B. When the reverse bucket 62 is at the neutral position C, the water jetted from the jet propelling apparatus 16 is split into left and right jets of water which are weaker than when the bucket is at the rearward traveling position B, and a rearward jet of water which is weaker than when the bucket is at the forward traveling position A. These jets of water are in balance so that the boat body 12 is brought into a state where it travels neither forward nor rearward.

Referring to FIG. 1 through FIG. 3, the jet propulsion boat 10 includes a steering sensor 68, an engine revolution speed sensor 70, and an ECU (Engine Control Unit) 72. The steering sensor 68 detects whether or not the steering handle 28 is turned beyond a predetermined angle, and a detection signal therefrom is inputted to the ECU 72. The engine revolution speed sensor 70 detects a revolution speed of the engine 14. A signal which indicates the revolution speed of the engine 14 is inputted to the ECU 72.

The ECU 72 is configured or programmed to control the engine 14. Specifically, the ECU 72 sends command signals to the fuel injector 44, the throttle actuator 48, and the ignition device 50, thus controlling these components electronically. The ECU 72 controls the fuel injector 44, and thus controls an amount of fuel to be supplied to the combustion chambers in the engine 14. The ECU 72 drives the throttle actuator 48, thus controlling the aperture size of the throttle valve 46 to control the engine revolution speed. The ECU 72 sets the aperture size of the throttle valve 46 according to the amount of operation of the first accelerator operation section 34 in a deceleration turning control, a deceleration straight travel control, and a reverse travel control. The ECU 72 sets the position of the reverse bucket 62 based on the amount of operation of the first accelerator operation section 34 and the amount of operation of the second accelerator operation section 38.

As shown in FIG. 3, the jet propulsion boat 10 includes a shift actuator 74 and a GCU (Gate Control Unit) 76. The shift actuator 74 is configured to move the reverse bucket 62 to one of the forward traveling position A, the rearward traveling position B, and the neutral position C. The shift actuator 74 includes a servomotor, for example, and is controlled by the GCU 76. The GCU 76 changes the position of the reverse bucket 62 by controlling the shift actuator 74 based on a command from the ECU 72.

In the present preferred embodiment, for example, the engine revolution speed sensor 70 and the ECU 72 define the speed determination section; the steering sensor 68 and the ECU 72 define the turning state determination section; and the ECU 72 and the GCU 76 define the controller. The forward traveling position A defines the first position, and the rearward traveling position B defines the second position.

Figure 4:
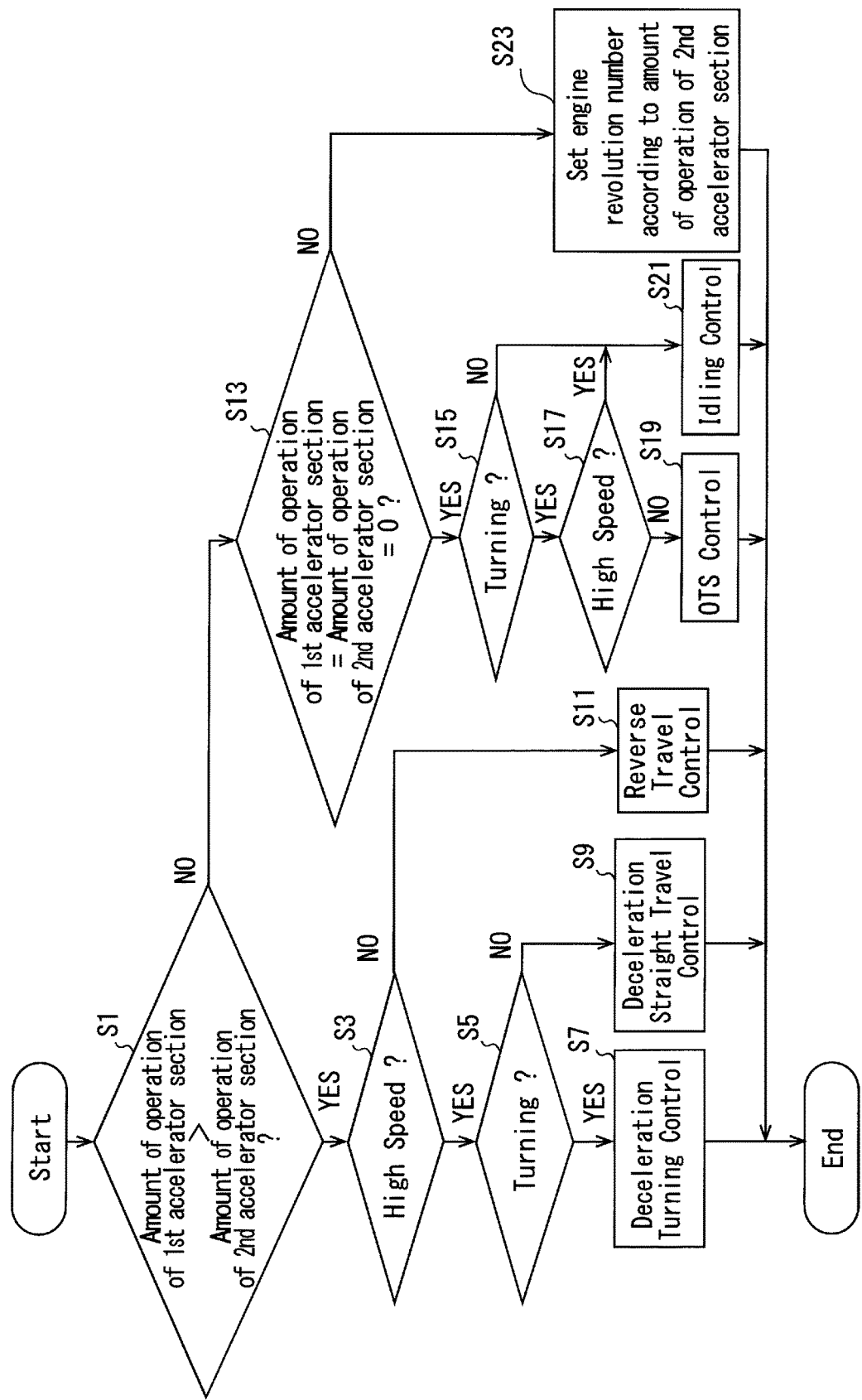
FIG. 4 is a flowchart showing an example of operating the jet propulsion boat.

Next, reference will be made to FIG. 4 to describe an example of operation of the jet propulsion boat 10.

The following operation is performed when the jet propulsion boat 10 is traveling, with the engine 14 in normal operation, and the reverse bucket 62 in the forward traveling position A.

First, the ECU 72 determines whether or not the amount of operation of the first accelerator operation section 34 is greater than the amount of operation of the second accelerator operation section 38 (Step S1). This is determined by comparison between a value detected by the position sensor 36 and a value detected by the position sensor 40.

If the amount of operation of the first accelerator operation section 34 is greater than the amount of operation of the second accelerator operation section 38, it is determined that a deceleration or backing operation is intended. Then the ECU 72 causes the GCU 76 to drive the shift actuator 74 to move the reverse bucket 62 from the forward traveling position A to the rearward traveling position B. Then the process moves to Step S3. In Step S3, the ECU 72 determines whether or not a boat speed (traveling state of the boat body 12) is high speed (Step S3). In this step, the number of engine revolutions, for example, is regarded as the boat speed, and determination is made as to whether the number of engine revolutions is not smaller than a threshold value, to see if the boat speed is high or not. It is preferable that the engine revolution speed detected by the engine revolution speed sensor 70 is filtered, and an obtained value is used as an engine revolution speed for comparison to a threshold value. Through this, an engine revolution speed which corresponds to the boat speed is preferably used to determine whether the speed is high or not. However, it is also acceptable to use the engine revolution speed as detected by the engine revolution speed sensor 70 for comparison to a threshold value to determine if the speed is high or not. The threshold value is the number of engine revolutions which allows planing of the boat, and is adjusted in accordance with various models (size, weight) of the jet propulsion boat 10, an output of the engine 14, etc. In the present preferred embodiment, the value is preferably set to about 4000 rpm, for example.

If it is determined that the boat speed is high, then the ECU 72 determines whether or not the boat body 12 is in a turning state (Step S5). This is determined by checking whether or not the steering sensor 68 is ON. The steering sensor 68 is turned ON when there is a determination that the operator intends to make a turn (i.e., the steering handle 28 is turned left or right beyond a predetermined angle). If the steering sensor 68 is ON, then it is determined that the boat body 12 is in a turning state, and the process moves to Step S7. Specifically, it is determined that there is going to be a deceleration operation followed by high speed turning. In Step S7, the ECU 72 performs a deceleration turning control to decrease the number of revolutions of the engine 14. In this step, an upper limit value for the number of revolutions of the engine 14 is set to a first predetermined value, and the number of revolutions of the engine 14 is set to a value in accordance with the amount of operation of the first accelerator operation section 34, and then the process comes to an end.

On the other hand, if Step S5 determines that the steering sensor 68 is in the OFF state, it is determined that the boat body 12 is not in a turning state, and the process goes to Step S9. Specifically, it is determined that there is going to be a deceleration operation followed by high speed straight travel. In Step S9, the ECU 72 performs a deceleration straight travel control to decrease the number of revolutions of the engine 14. In this step, an upper limit value for the number of revolutions of the engine 14 is set to a second predetermined value (which is greater than the first predetermined value), and the number of revolutions of the engine 14 is set to a value in accordance with the amount of operation of the first accelerator operation section 34, and then the process comes to an end.

If Step S3 determines that the boat speed (traveling state of the boat body 12) is not high, then the process goes to Step S11. Specifically, it is determined that a backing operation is to be performed. In Step S11, the ECU 72 performs a reverse travel control. In this step, an upper limit value for the number of revolutions of the engine 14 is set, and the number of revolutions of the engine 14 is set to a value in accordance with the amount of operation of the first accelerator operation section 34, and then the process comes to an end.

If Step S1 determines that the amount of operation of the first accelerator operation section 34 is not greater than the amount of operation of the second accelerator operation section 38, it is determined that forward traveling operation without deceleration is being performed, so the reverse bucket 62 stays at the forward traveling position A, i.e., it is not moved. Then the process moves to Step S13. In Step S13, the ECU 72 determines whether or not both the amount of operation of the first accelerator operation section 34 and the amount of operation of the second accelerator operation section 38 are zero. This is determined by checking if both a value detected by the position sensor 36 and a value detected by the position sensor 40 are zero. If both the amount of operation of the first accelerator operation section 34 and the amount of operation of the second accelerator operation section 38 are zero, then the ECU 72 determines whether or not the boat body 12 is in a turning state (Step S15). This is determined by checking whether or not the steering sensor 68 is turned ON. If the steering sensor 68 is ON, then it is determined that the boat body 12 is in a turning state, and the process moves to Step S17. In Step S17, the ECU 72 determines whether or not a boat speed (traveling state of the boat body 12) is high (Step S17). This is determined in the same manner as in Step S3 described above. If it is determined that the boat speed is not high, then the ECU 72 performs an OTS (Off Throttle Steering) control (Step S19). Under the OTS control, a propulsion force necessary for the jet propulsion boat 10 to make a turn is generated by the jet propelling apparatus 16 (e.g., the number of engine revolutions is increased to a target number of revolutions). This makes it easy to berth the boat even when a propulsion force is insufficient (speed is slow) to turn the jet propulsion boat 10. After Step S19, the process comes to an end.

On the other hand, if Step S15 determines that the steering sensor 68 is in the OFF state, it is determined that the boat body 12 is not in a turning state, and the process goes to Step S21. If Step S17 determines that the boat speed is high, the process also goes to Step S21. In Step S21, the ECU 72 performs an idling control. In the idling control, the number of revolutions of the engine 14 is automatically set to a target revolution number by the ECU 72 in accordance with a temperature of the engine 14, a temperature of the intake air, load on the engine 14, etc., to bring the engine 14 into an idling state, and then the process comes to an end.

In Step S13, if at least one of the amount of operation of the first accelerator operation section 34 and the amount of operation of the second accelerator operation section 38 is not zero, it is determined that the amount of operation of the second accelerator operation section 38 is greater than the amount of operation of the first accelerator operation section 34, and in response, the ECU 72 sets the number of revolutions of the engine 14 to a value in accordance with the amount of operation of the second accelerator operation section 38 (Step S23), and the process comes to an end.

It should be noted here that if the steering sensor 68 changes its state from ON to OFF during the deceleration control, the upper limit value for the number of engine revolutions is changed from the first predetermined value to the second predetermined value.

According to the jet propulsion boat 10 described thus far, the number of revolutions of the engine 14 is decreased when the boat body 12 makes a turn while traveling at a high speed. Therefore, the centrifugal force acting on the side of the boat body (lateral G force) is reduced, and a load exerted on the rider is decreased even when traveling at a high speed. This arrangement makes it possible to turn the boat body 12 with a lower level of skill than that conventionally required. Such an engine control is preferably performed at a time of deceleration operation when the boat is slowed down intentionally by the operator.

An upper limit value is set for the number of revolutions of the engine 14 upon determination that the traveling state of the boat body 12 is high speed and the boat body 12 is in a turning state. This decreases the load exerted on the rider under high speed traveling, and ensures that the boat body 12 is turned with a lower level of skill than that conventionally required.

When the boat body 12 is moving at high speed, an upper limit value for the number of revolutions of the engine 14 is set to the first predetermined value if a turn is to be made; on the other hand, if a turn is not to be made, the upper limit value for the number of revolutions of the engine 14 is set to the second predetermined value which is greater than the first predetermined value. This makes it possible to reduce lateral thrust, i.e., centrifugal force acting on the side of the boat body, when making a turn, and ensures a braking capability to decelerate when not making a turn (when traveling straightly).

The reverse bucket 62 changes the direction of the jetted water from the jet propelling apparatus 16 making it possible to easily and reliably decelerate the boat body 12.

If the amount of operation of the first accelerator operation section 34 is not greater than the amount of operation of the second accelerator operation section 38, the reverse bucket 62 is disposed at the forward traveling position A (the first position). On the other hand, if the amount of operation of the first accelerator operation section 34 is greater than the amount of operation of the second accelerator operation section 38, it means that a deceleration operation is being performed, and so the reverse bucket 62 is disposed at the rearward traveling position B (the second position). As described above, the deceleration operation is performed easily by a simple operation on the first accelerator operation section 34 and the second accelerator operation section 38 such that the direction of water jetted from the jet propelling apparatus 16 is changed and the boat body 12 is decelerated easily.

Because the amount of operation of the first accelerator operation section 34 and the amount of operation of the second accelerator operation section 38 are used as a basis to determine whether or not the reverse bucket 62 should be moved, this arrangement makes it possible to move the reverse bucket 62 based on an accurate detection of the operator's intention to decelerate, to move backward, or to move forward.

It should be noted here that in the preferred embodiments described above, a determination whether or not the deceleration operation is performed is preferably made based on the amount of operation of the first accelerator operation section 34 and the amount of operation of the second accelerator operation section 38. However, the present invention is not limited to this. For example, the determination whether or not a deceleration operation is made may be based only on the first accelerator operation section 34 in order to select the position of the reverse bucket 62. In this case, deceleration operation is performed easily by simply operating the first accelerator operation section 34.

In the preferred embodiments described above, Steps S3 and S17 preferably use the number of engine revolutions as an approximation of the boat speed. However, the boat speed may be used instead. The boat speed may be calculated from the engine revolution speed, or may be detected by using GPS, or a sensor such as a pitot tube, for example.

The above preferred embodiments preferably make use of the ECU 72 and the GCU 76, for example. However, a single controller which defines and functions as an ECU and a GCU may be used.

In the above preferred embodiments, the first accelerator operation section 34 preferably includes a lever, for example. However, a member other than a lever may be used. For example, a pedal, a grip, a switch, etc. may be used as the first accelerator operation section. In the above preferred embodiments, the second accelerator operation section 38 preferably includes a lever, for example. However, a member other than a lever may be used. For example, a pedal, a grip, a switch, etc. may be utilized as the second accelerator operation section.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A jet propulsion boat comprising:
a boat body;
a jet propelling apparatus configured to propel the boat body;
an engine configured to drive the jet propelling apparatus;
a speed determination section configured or programmed to determine whether or not the boat body is in a first speed traveling state, the first speed traveling state being when a number of engine revolutions or a boat speed is not smaller than a threshold value;
a turning state determination section configured or programmed to determine whether or not the boat body is in a turning state; and
a controller configured or programmed to control the engine based on results of the determinations made by the speed determination section and the turning state determination section; wherein
the controller is configured or programmed to decrease a number of revolutions of the engine if the speed determination section determines that the boat body is in the first speed traveling state and the turning state determination section determines that the boat body is in the turning state.

2. The jet propulsion boat according to claim 1, wherein the controller is configured or programmed to set an upper limit value for the number of revolutions of the engine if the speed determination section determines that the boat body is in the first speed traveling state and the turning state determination section determines that the boat body is in the turning state.

3. The jet propulsion boat according to claim 2, wherein:
the controller is configured or programmed to set the upper limit value for the number of revolutions of the engine to a first predetermined value if the speed determination section determines that the boat body is in the first speed traveling state and the turning state determination section determines that the boat body is in the turning state; and
the controller is configured or programmed to set the upper limit value for the number of revolutions of the engine to a second predetermined value, which is greater than the first predetermined value, if the speed determination section determines that the boat body is in the first speed traveling state but the turning state determination section determines that the boat body is not in the turning state.

4. The jet propulsion boat according to claim 1, wherein the controller is configured or programmed to control the engine based on results of the determinations made by the speed determination section and the turning state determination section when a deceleration operation is determined.

5. The jet propulsion boat according to claim 1, wherein the jet propelling apparatus includes a reverse bucket configured to move to a first position to move the boat body forward, and to a second position to decrease a forward propulsion force of the boat body.

6. The jet propulsion boat according to claim 5, further comprising a first accelerator operation section configured to control operations of the boat body; wherein
the controller is configured or programmed to determine the reverse bucket position at least based on an operation of the first accelerator operation section.

7. The jet propulsion boat according to claim 6, further comprising a second accelerator operation section configured to control operations of the boat body; wherein
the controller is configured or programmed to determine the reverse bucket position based on an amount of the operation of the first accelerator operation section and an amount of operation of the second accelerator operation section.

8. The jet propulsion boat according to claim 4, further comprising a first accelerator operation section and a second accelerator operation section configured to control operations of the boat body; wherein
the controller is configured or programmed to determine that the deceleration operation is made when the amount of operation of the first accelerator operation section is greater than the amount of operation of the second accelerator operation section.

9. The jet propulsion boat according to claim 1, wherein the turning state determination section is configured or programmed to determine that the boat body is in the turning state when a steering handle is turned left or right beyond a predetermined angle.

10. The jet propulsion boat according to claim 1, wherein the boat body is in a planing state when the boat body is in the first speed traveling state.

* * * * *